July 28, 1964 B. FALK ETAL 3,142,834
ANALOG DATA ENCODER
Filed March 26, 1959 2 Sheets-Sheet 1

INVENTORS.
BERND FALK
JERRE M. MURCHISON
BY
Walter J. Jason
ATTORNEY.

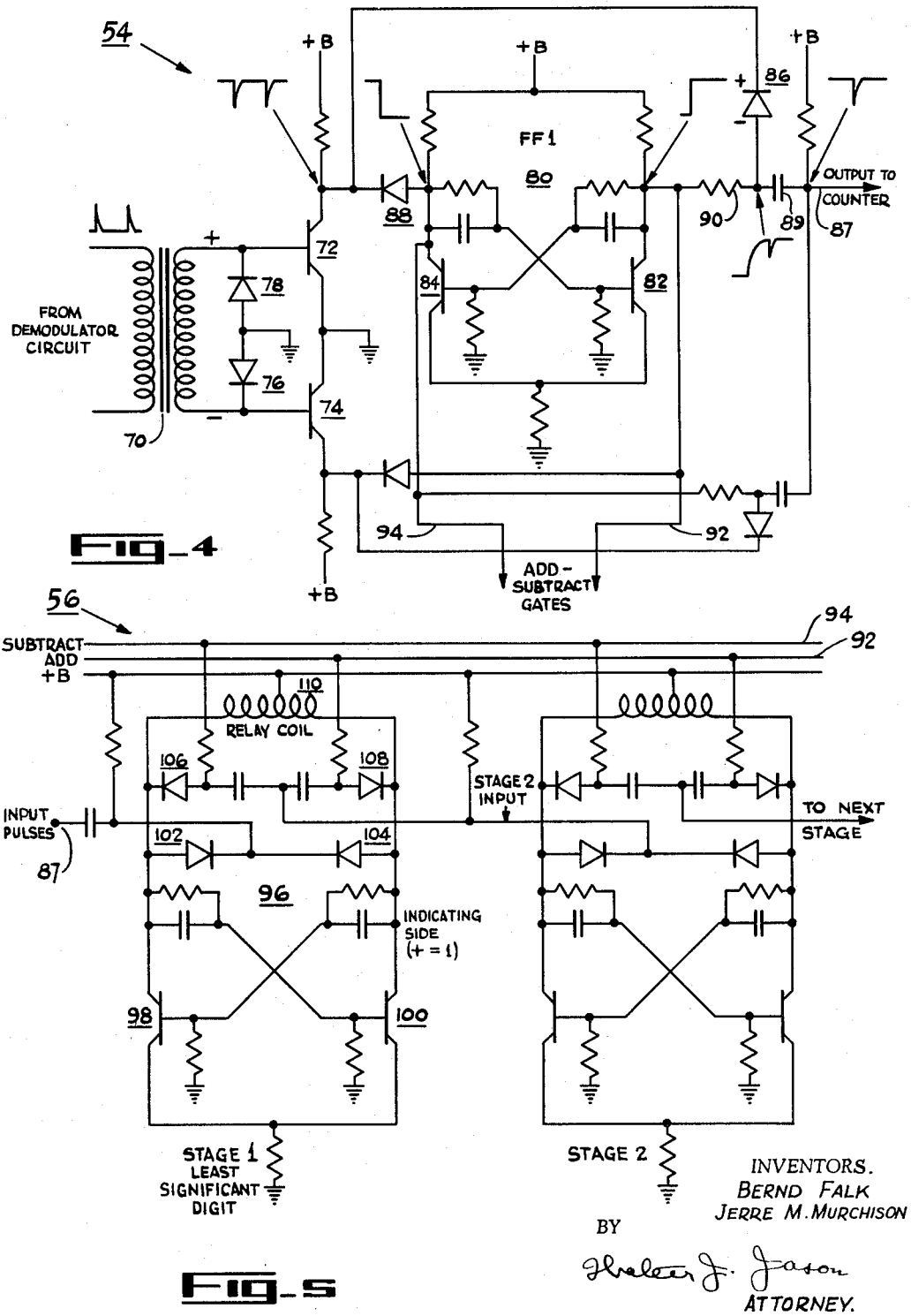

United States Patent Office 3,142,834
Patented July 28, 1964

3,142,834
ANALOG DATA ENCODER
Bernd Falk and Jerre M. Murchison, Fort Worth, Tex., assignors to General Dynamics Corporation, San Diego, Calif., a corporation of Delaware
Filed Mar. 26, 1959, Ser. No. 802,156
2 Claims. (Cl. 340—347)

This invention relates to an encoder and particularly to an encoder adapted to measure and encode analog data for easy read-out in digital form.

Heretofore devices for measuring and encoding data were so constructed as to necessitate the use of read-out potentiometers digital shaft encoders, or the like which were extremely difficult to read out for digital data reduction. The encoder of the present invention provides a device which eliminates the need of the use of cumbersome read-out devices and lends itself to a completely automatic data reduction.

It is therefore an object of this invention to provide apparatus which is capable of encoding an analog quantity.

Another object of the present invention is to provide apparatus capable of accurately measuring and encoding an unknown analog quantity.

It is still another object of the present invention to provide apparatus capable of accurately measuring and encoding an unknown analog quantity which can be readily converted to a digital quantity.

These and other objects will be apparent from the following detailed description when taken with the accompanying drawings.

FIGURE 4 is a schematic diagram of the pulse and gate generator of FIGURE 1; and FIGURE 5 is a schematic diagram of the counter of FIGURE 1.

Figure 1:
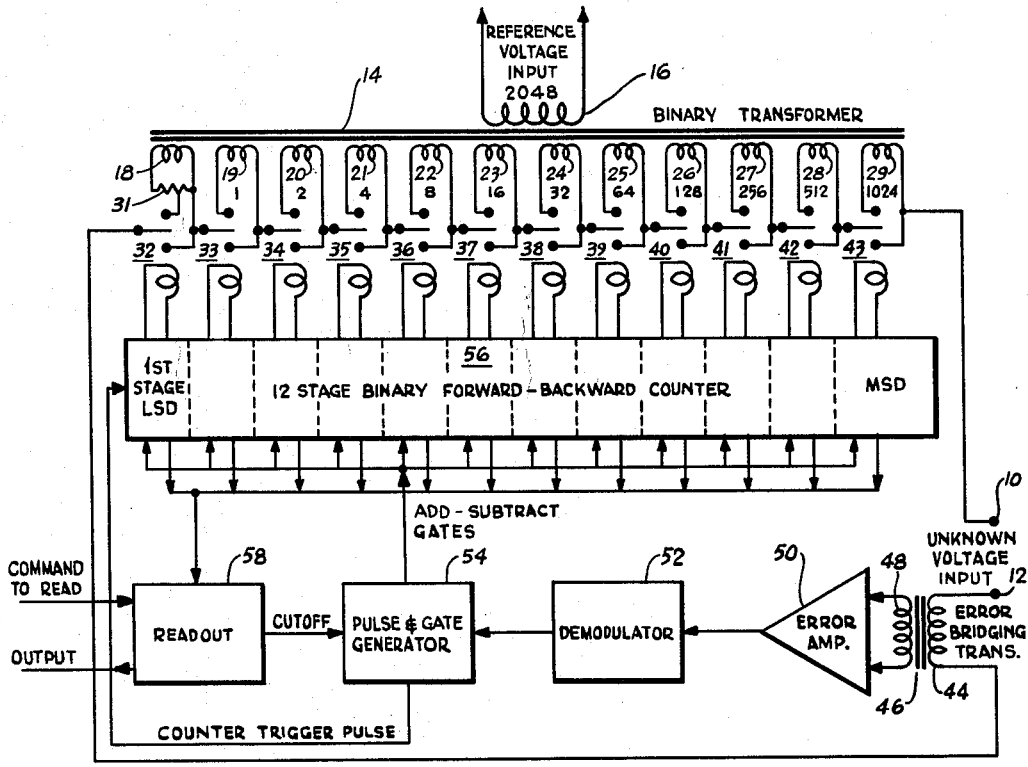
FIGURE 1 is a block diagram of the encoder embodying the principles of the invention.

Referring to the drawings there is illustrated in FIGURE 1, in block diagram form, the analog data encoder of the present invention having unknown analog voltage input terminals 10 and 12. A binary transformer 14 has a primary winding 16 connected to a reference voltage of an analog computing system (not shown), and secondary windings 18–29 for providing output voltages having a binary progression. Relay switches 32–43 are associated with the secondary windings 18–29, respectively, such that the output voltages of the individual windings can be series summed. The output of the binary transformer is taken from the secondary windings and is fed to a bridging transformer 46 to be compared with an unknown voltage applied at terminals 10 and 12, which is to be encoded. From the bridging transformer, the compared, or error voltage, is fed to a conventional amplifier 50 and then passed to a demodulator or detecting circuit 52 wherein it is integrated over positive half cycles of the reference voltage to provide an integrated error voltage and passed on in the form of error pulses having a polarity corresponding to the phase difference between the error and reference voltages over the negative half cycles of the reference voltage. The error pulses formed in the demodulator 52 are fed to a pulse and gate generator 54 which senses the sign of the error pulses and produces a series of trigger pulses for activating a forward-backward counter 56 as well as gate pulses which determine whether the counter will assume an add or subtract state. If an add gate pulse is produced, the voltage across the output of the binary transformer needs to be increased to make it equal to the unknown voltage input at terminals 10 and 12. On the other hand if a subtract gate pulse is generated, the binary transformer output needs to be decreased. The binary counter 56 has twelve stages and is capable of adding and subtracting when caused by the pulse and gate generator 54 to add or subtract to its existing count. The relays 32–43 connected to the individual stages of the counter 56 cause the binary transformer secondary voltage to vary according to the count in the counter 56. Thus, the count continues until the binary transformer secondary output voltage equals the unknown input signal voltage, at which time there is no error voltage. The state of the counter 56 thus indicates the ratio of the unknown input signal voltage to the reference voltage. A conventional read-out unit 58, connected to the counter completes the device of the present invention. A "command to read-out" pulse can be supplied to the read-out unit by any conventional pulse producing generator (not shown) to cause the read-out to sample each stage of the counter 56 in succession to provide an output of the encoded data to any conventional tape recorder (not shown). Thus, it is readily apparent that an encoder is provided by the present invention which measures an unknown analog quantity accurately encodes the measured quantity and provides for easy reduction of the encoded quantity to a digital form.

Referring to FIGURE 1, in greater detail, the binary transformer 14, which converts a reference voltage to a plurality of output voltages having a binary progression, has preferably a supermalloy toroid core and a primary winding 16 adapted to be connected to the source of reference voltage provided by the analog computing system (not shown). The primary winding 16 has $k2^n$ turns, where $k$ is equal to $\frac{1}{4}$ and $n$ is equal to the number of binary digits to be encoded, which in this case numbers 13. The total number of primary turns is 2048, as indicated. The binary transformer is also provided with a plurality of secondary windings 18–29 having turns proceeding in a binary progression, that is, the windings 18–29 are wound with $k2^{n-12}$, $k2^{n-11}$, $k2^{n-10}$, $k2^{n-9}$, $k2^{n-8}$, $k2^{n-7}$, $k2^{n-6}$, $k2^{n-5}$, $k2^{n-4}$, $k2^{n-3}$, $k2^{n-2}$, and $k2^{n-1}$ turns, or as illustrated, 1, 2, 4, 8, 16, 32, 64, 128, 256, 512 and 1024 turns, respectively.

To accomplish series summing of the voltage outputs of the individual secondary windings 18–29 at will, the ends of each of the windings are connected to the stationary switch contacts of the corresponding relay switch, with the exception of secondary winding 18. According to the above adopted binary progression winding 18 should have one half turn, but since this is practically difficult to achieve, a one turn winding is provided which has a resistor 31 connected across the ends of winding 18 to produce a voltage output corresponding to a half turn. One stationary switch contact of the relay switch 32 is connected to one end of the winding 18 and the other end is connected to the appropriate portion of the resistor 31 to obtain the voltage output corresponding to a half turn of the winding. The movable contacts of the relays 33–43 are connected to one end of the secondary windings 18–29, respectively.

The summed voltage outputs of the binary transformer 14 are compared to the unknown voltage input applied at terminals 10 and 12 by connecting terminal 10 to one end of secondary winding 29, terminal 12 to one end of the primary winding 44 of the error bridging transformer 46, and the other end of the primary winding 44 to the movable switch contact of relay 32. The voltage produced at the secondary winding 48 of the error bridging transformer is the difference in phase and magnitude between the binary transformer summed output voltages and the unknown voltage input at the terminals 10 and 12.

Amplification of the output, or error voltage produced by the bridging transformer 46 is obtained by means of a conventional amplifier 50, which provides an input to the chopper demodulator or error detecting circuit 52, wherein the amplified error voltage is converted to pulses having a magnitude proportional to the error voltage and a polarity corresponding to the error voltage phase.

Figure 2:
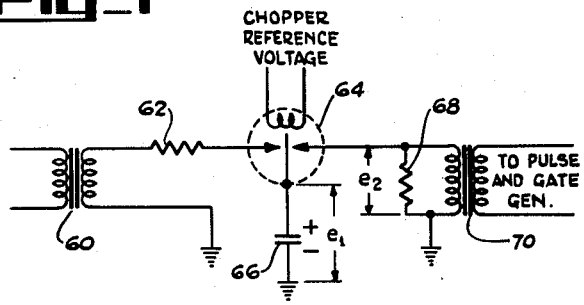
FIGURE 2 is a schematic diagram of the demodulator of FIGURE 1.

Referring to FIGURE 2 there is shown therein the circuit of demodulator 52. The amplified error voltage obtained from the amplifier 50 is applied by means of a transformer coupling 60 through a resistor 62 to one of the stationary contacts of a chopper 64 adapted to be actuated by the reference voltage of the analog computing system (not shown). A capacitor 66 is connected to the movable contact of the chopper 64 at one side, the other side being connected to ground. A resistor 68 connected in parallel with the primary winding of an output transformer 70 has one end connected to the other stationary contact of the chopper and the other end connected to ground. The secondary winding of the transformer 70 provides the input to the pulse and gate generator 54.

Figure 3:
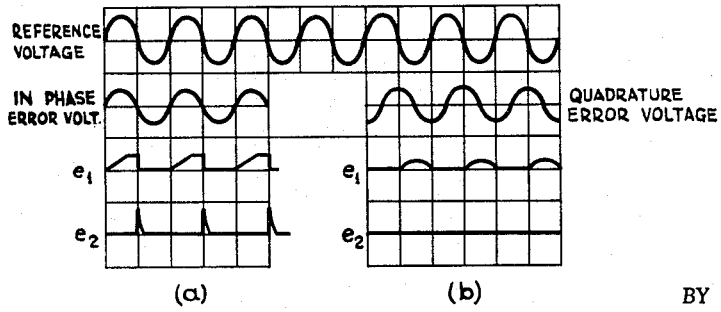
FIGURE 3 is a graph showing of the voltages to be found in various portions of the demodulator circuit of FIGURE 2.

Referring now to FIGURE 3, portion (a), if the error voltage is in phase with the reference voltage applied to the chopper, and the circuit constants are such that the resistance of the resistor 62 is greater than the reactance of the capacitor 66, positioning of the movable contact of the chopper to the left provides for integration of the error voltage by the capacitor 66 and resistor 62. Thus, with an in phase error voltage, the voltage $e_1$, across the capacitor 66 builds up to a maximum value during the first half cycle. During the next half cycle, the chopper connects the capacitor 66 to the resistor 68 and the transformer 70 and with the value of resistor 68, being low, the voltage built upon capacitor 66 discharges almost instantaneously producing a pulse output from the transformer 70.

Referring now to FIGURE 3, portion (b), it is readily apparent that an effective quadrature rejection is accomplished by the demodulator 52. Thus, if the error voltage is in quadrature with the reference voltage, the charging current through the capacitor 66 reverses at the center of the chopper dwell resulting in a net charge of zero on the capacitor 66 at the end of the chopper half cycle. Therefore, when the chopper connects to its right terminal, no output pulse is produced. This provides for a very effective quadrature rejection since any output pulse from the transformer 70 must be proportional to the in-phase component of the error voltage.

Referring now to FIGURE 4, wherein there is shown the circuit arrangement of the pulse and gate generator 54, which is responsive to the error pulses produced by the demodulator 52, for generating trigger pulses and add or subtract gate pulses which correspond to the polarity of the error pulses. In the absence of any error pulses from the transformer 70 neither of the collectors of transistors 72 and 74 draws current, since no base current flows. However, if there are error pulses produced of positive polarity, as illustrated, the diode 76 and the base of transistor 72 cause a current to flow in the collector of transistor 72, but the collector of transistor 74 does not draw current. If the polarity of the input error pulses were reversed, current would flow to the base of transistor 74 and cause current to be drawn by its collector, the collector of transistor 72 in turn drawing no current. Thus, it is seen that positive and negative error pulses from the transformer 70 are separated and appear separately on either the collector of transistor 72 or collector of transistor 74, as described above. With a positive polarity of error pulses shown, current flowing in the base of transistor 72 causes amplification to take place resulting in a negative pulse at the collector of transistor 72. Assuming flip-flop 80, which comprises transistors 82 and 84 to be initially set such that the collector of transistor 82 is conducting, i.e. the collector is near ground potential, the diode 86 will have an inverse bias applied to it and the first trigger pulse will not be conducted to the output line 87. However, since diode 88 is biased in the forward direction, the negative pulse at the collector of transistor 72 causes the flip-flop 80 to change its state such that the collector of transistor 82 goes to B+ and stops conducting current whereas the collector of transistor 84 goes to ground and conducts. It can be thus readily seen that when the collector of transistor 82 stops conducting and goes to B+ a gate pulse is produced in the add line 92 leading to the counter 56. If the error pulses were of a negative polarity it is readily apparent that the reverse situation would result. In this case the collector of transistor 82 would go from B+ to ground to conduct, whereas the collector of transistor 84 goes from ground to B+ to stop conductor and produce a gate pulse in the subtract line 94. In summation it is seen that whether the flip-flop 80 produces an add gate pulse or a subtract gate pulse is determined by whether the input error pulse was of positive or negative polarity. If an add gate pulse has been produced it is an indication that additional voltage from the binary transformer 14 must be introduced to eliminate the error voltage. On the other hand if a subtract gate pulse is produced it is an indication that the voltage from the binary transformer must be lowered to eliminate the error voltage. The above addition and subtraction is accomplished by appropriate actuation of the relays 32–43 by the counter 56 to be hereinafter described.

Assume now that a second pulse of the same polarity is introduced into the circuit of the pulse and gate generator 54. Under these conditions the collector of transistor 82 is now positive with the capacitor 89 charged through resistor 90 such that the diode 86 is now biased in the forward direction. This allows the second trigger pulse to be conducted through the diode 86 to the output line 87, the net result being that the output trigger pulses from the pulse and gate generator are inhibited until the add or subtract gate lines 92 and 94 have been properly set as hereinbefore described.

Referring to FIGURE 5, there is shown the first two stages of a twelve stage counter 56. The first stage comprises a conventional flip-flop circuit 96 having transistors 98 and 100. Assuming the transistor 100 to be initially conducting (the stage indicates a 0), the collector of transistor 98 will be at B+. A negative pulse at the input 87 causes diode 102 to conduct and the collector of transistor 98 to fall to zero potential, the stage flipping to the other conduction state. The next input pulse would cause diode 104 to conduct, thus flipping the stage to its original state.

Assuming now that an add situation has developed, the add line 92 will have been actuated to a B+ condition, and the subtract line 94 will be at ground potential due to the action of the pulse and gate generator 54. The diode 106 is always inversely biased and therefore conduction therethrough cannot take place. However, the diode 108 is biased in the forward direction and the second stage follows the collector of transistor 100, and being sensitive to negative trigger pulses, will flip as the transistor 100 goes into conduction. The going into conduction of transistor 100 represents a least significant digit going from 1 to 0. Therefore, a carry in the form of a trigger pulse to the next stage, which is of similar construction as the first stage, is generated, and the stage goes from 0 to 1. This process continues for all twelve stages of the counter.

Assuming now that it is necessary to subtract. The subtract line 94 has been brought to a B+. This permits diode 106 to conduct. The second stage is then triggered by the first stage going from 0 to 1. This represents a borrow from the next most significant digit.

Accordingly, from the above it is readily seen that either the add or subtract lines 92 and 94 are energized, as required, and the counter actuates the relay switches 32-43 to add or subtract binary transformer voltage to the existing count, as needed, to follow variations in the unknown input voltage.

The relay switches 32-43, which are connected to the various stages of the counter, are preferably of the polarized chopper type having center tapped coils, such as shown at 110. The relay switches should be operable in substantially less than ½ cycle of the reference voltage frequency.

Although a specific embodiment of the present invention has been described and illustrated in detail, it is to be clearly understood that the same is by way of illustration and example only; it is to be understood that the invention is not limited thereto, as many variations will be apparent to those versed in the art and the invention is to be given its broadest possible interpretation within the terms of the appended claims.

What is claimed is:

1. An analog data encoder comprising reversible binary counter means, means adapted to be responsive to a reference wave signal for producing a signal corresponding to the existing count represented by said counter means, means for comparing said signal with an unknown signal to produce an error signal, an integrator circuit having capacitor means connected to said comparing means, a pulse forming circuit, switch means interposed between said integrator circuit and said pulse forming circuit and adapted to be responsive to said reference wave signal for closing said integrator circuit to render said integrator circuit responsive to said error signal to charge said capacitor means during positive half cycles of said reference wave signal and for connecting said pulse forming circuit across said capacitor means to discharge said capacitor means therethrough during negative half cycles of said reference wave signal to produce error pulses, and means responsive to said error pulses for producing a signal to activate said counter means and a signal to control said counter means in either a forward or backward direction to add to or subtract from said existing count depending on the polarity of said error pulses until said error signal is eliminated, whereby the count in said counter means after said error signal is eliminated represents said unknown signal.

2. An analog data encoder comprising reversible binary counter means, means adapted to be responsive to a reference wave signal for producing a signal corresponding to the existing count represented by said counter means, means for comparing said signal with an unknown signal to produce an error signal, an integrator circuit having capacitor means connected to said comparing means, a pulse forming circuit, switch means interposed between said integrator circuit and said pulse forming circuit and adapted to be responsive to said reference wave signal for closing said integrator circuit to render said integrator circuit responsive to said error signal to charge said capacitor means during positive half cycles of said reference wave signal and for connecting said pulse forming circuit across said capacitor means to discharge said capacitor means therethrough during negative half cycles of said reference wave signal to produce error pulses, pulse generator means responsive to said error pulses for producing trigger pulses of either polarity to activate said counter means, and means responsive to said trigger pulses for generating gate pulses to control said counter means in either a forward or backward direction to add to or subtract from said existing count until said error signal is eliminated, whereby the count in said counter means after said error signal is eliminated represents said unknown signal.

References Cited in the file of this patent

UNITED STATES PATENTS

| 2,715,678 | Barney | Aug. 16, 1955 |
| 2,738,504 | Gray | Mar. 19, 1956 |
| 2,762,038 | Lubkin | Sept. 4, 1956 |
| 2,787,418 | MacKnight | Apr. 2, 1957 |
| 2,834,011 | Mork | May 6, 1958 |
| 2,839,740 | Haanstra | June 17, 1958 |
| 2,872,670 | Dickinson | Feb. 3, 1959 |
| 2,965,891 | Martin | Dec. 20, 1960 |
| 3,019,426 | Gilbert | Jan. 30, 1962 |
| 3,063,018 | Gordon et al. | Nov. 6, 1962 |

FOREIGN PATENTS

| 157,970 | Australia | July 3, 1952 |
| 731,650 | Great Britain | June 8, 1955 |
| 796,995 | Great Britain | June 25, 1958 |

OTHER REFERENCES

Electronics, Engineering Edition, Aug. 1, 1958, vol. 31 (pp. 90-93).

Instruments and Automation, vol. 29, issue 5, May 1956 (pp. 911-917).